United States Patent [19]

Castillo et al.

[11] 4,382,015

[45] * May 3, 1983

[54] PASSIVATION OF METAL CONTAMINANTS ON CRACKING CATALYST

[75] Inventors: Carmen Castillo, Lyons; John C. Hayes, Palatine, both of Ill.

[73] Assignee: UOP Inc., Des Plaines, Ill.

[*] Notice: The portion of the term of this patent subsequent to Nov. 30, 1999, has been disclaimed.

[21] Appl. No.: 344,106

[22] Filed: Jan. 29, 1982

Related U.S. Application Data

[63] Continuation-in-part of Ser. No. 209,073, Nov. 21, 1980, Pat. No. 4,364,848, which is a continuation-in-part of Ser. No. 132,602, Mar. 21, 1980, abandoned.

[51] Int. Cl.³ .................. B01J 29/38; B01J 21/20; C10G 11/18; C10G 11/05
[52] U.S. Cl. .................. 252/417; 252/411 R; 252/416; 208/52 CT; 208/113; 208/120
[58] Field of Search ............... 252/411 R, 411 S, 416, 252/417; 208/52 CT, 113, 120

[56] References Cited

U.S. PATENT DOCUMENTS

| | | | |
|---|---|---|---|
| 2,425,482 | 8/1947 | Moser | 196/52 |
| 2,575,258 | 11/1951 | Corneil et al. | 252/417 |
| 2,758,097 | 8/1956 | Doberty et al. | 252/413 |
| 3,120,484 | 2/1964 | Mills et al. | 252/411 R |
| 3,252,918 | 5/1966 | Disegna et al. | 252/416 |
| 3,324,044 | 6/1967 | Oberhofer | 252/413 |
| 3,711,422 | 1/1973 | Johnson et al. | 252/414 |
| 3,838,038 | 9/1974 | Greenwood et al. | 208/108 |
| 4,013,546 | 3/1977 | Suggitt et al. | 252/415 |
| 4,014,815 | 3/1977 | Gamble et al. | 252/412 |
| 4,025,458 | 5/1977 | McKay | 252/416 |
| 4,176,083 | 11/1979 | McGovern et al. | 252/411 R |
| 4,268,416 | 5/1981 | Stine et al. | 252/416 |
| 4,280,895 | 7/1981 | Stuntz et al. | 208/113 |

OTHER PUBLICATIONS

*Deposited Metals Poison F.C.C. Catalysts*—R. N. Cimbalo et al., Oil & Gas Journal, 5/15/72, vol. 70, No. 20, pp. 112–122.

*Primary Examiner*—P. E. Konopka
*Attorney, Agent, or Firm*—James R. Hoatson, Jr.; Louis A. Morris; William H. Page, II

[57] ABSTRACT

A contaminating metal on a cracking catalyst used for the cracking of hydrocarbons is passivated by contacting the catalyst with a hydrocarbon gas or mixture of gases comprising molecules of three carbon atoms or less at passivation reaction conditions prior to the cycling of the catalyst to the cracking zone, which conditions include a temperature in excess of 1300° F.

6 Claims, No Drawings

PASSIVATION OF METAL CONTAMINANTS ON CRACKING CATALYST

This application is a continuation-in-part of our prior copending application Ser. No. 209,073, filed Nov. 21, 1980, now U.S. Pat. No. 4,364,848, which is a continuation-in-part of our prior, copending application Ser. No. 132,602 filed Mar. 21, 1980 now abandoned, both prior applications incorporated herein by reference.

BACKGROUND OF THE INVENTION

1. Field of the Invention

The field of art to which the claimed invention pertains is the catalytic cracking of hydrocarbons. More specifically, the claimed invention relates to a process for the passivation of contaminating metals on a fluidized cracking catalyst.

2. Description of the Prior Art

There are a number of continuous cyclical processes employing fluidized solid techniques in which carbonaceous materials are deposited on the solids in the reaction zone and the solids are conveyed during the course of the cycle to another zone where carbon deposits are at least partially removed by combustion in an oxygen-containing medium. The solids from the latter zone are subsequently withdrawn and reintroduced in whole or in part to the reaction zone.

One of the more important processes of this nature is the fluid catalytic cracking process for the conversion of relatively high-boiling hydrocarbons to lighter hydrocarbons boiling in the heating oil or gasoline (or lighter) range. The hydrocarbon feed is contacted in one or more reaction zones with the particulate cracking catalyst maintained in a fluidized state under conditions suitable for the conversion of hydrocarbons.

A common problem in the fluid catalytic cracking process is the gradual deterioration of the catalyst due to the deposition on the catalyst of metal contaminants contained in the hydrocarbon feed, such as nickel, iron, vanadium and probably cobalt. These deposited metal contaminants increase the production of hydrogen, light gases and coke at the expense of the highly desirable gasoline.

The art teaches many techniques for dealing with these undesirable metal contaminants. Such techniques can be divided into two broad categories, one being the passivation of the contaminants by reacting the catalyst with a passivating agent, which converts the metal contaminants to a relatively innocuous form, and the other being the physical removal of the contaminants from the catalyst. Examples of techniques falling within the former category are as taught or claimed in U.S. Pat. Nos. 2,758,097 (reaction with phosphorus pentoxide); 3,711,422 (reaction with an antimony compound); and 4,025,458 (reaction with chemical complexes containing antimony). Examples of techniques falling within the latter category are as taught or claimed in U.S. Pat. Nos. 3,252,918; 3,324,044; 4,013,546; and 4,014,815.

In U.S. Pat. No. 2,575,258 there is claimed a method for treating an $Fe_2O_3$ contaminated FCC catalyst by reacting the catalyst with a reducing gas which may comprise a hydrocarbon having not more than three carbon atoms per molecule to convert the $Fe_2O_3$ to $Fe_3O_4$. The text of the specification of this patent admonishes against conversion of any substantial amount of the $Fe_2O_3$ to metallic iron since the latter "detrimentally affects the activity of the catalyst." The reaction conditions of this patent are carefully chosen, therefore, to cause the conversion of the $Fe_2O_3$ only to the $Fe_3O_4$ form.

U.S. Pat. No. 2,425,482 claims the treatment of regenerated FCC catalyst with light olefins for "improving the octane rating of the gasoline produced as a result of cracking with the so-treated catalyst." This reference makes no mention of contaminating metals, however, it does exemplify use of the invention in an FCC process to which is charged feedstock comprising a 500° to 700° F. gas oil cut of an East Texas crude. That particular gas oil is known to have a total nickel, cobalt and iron content less than 0.5 ppm by weight.

U.S. Pat. No. 4,176,083 discloses the purging of hot regenerated FCC catalyst with a fuel gas which may comprise $C_3$ and lower boiling components of a hydrocarbon cracking operation. The purpose of the purging is to displace entrained $CO_2$ containing flue gas from the catalyst prior to returning the catalyst to the reactor. This reference makes no mention of contaminating metals or even the particular charge stock employed.

There is also art that teaches reduction and sulfiding treatment of non-fluidized moving catalyst beds to temper the activity of certain desired metals, such as those contained in Group VIII of the Periodic Table, intentionally added to the catalyst. The processes in which these moving catalyst beds are used include processes requiring the presence of hydrogen, such as hydrocracking and reforming. U.S. Pat. No. 3,838,038 is an example of such art teaching reduction and sulfiding of a non-fluidized catalyst containing certain desired metals.

We have found an improved process for passivating an undesired metal contaminant on a fluid cracking catalyst for use in a fluidized cracking system.

SUMMARY OF THE INVENTION

It is, accordingly, a broad objective of our invention to achieve passivation of undesired metal contaminants on a fluid catalytic cracking catalyst.

In brief summary, our invention is a process for passivating a metal on a fluidized cracking catalyst which has been contaminated with that metal due to the use of the catalyst in a fluidized cracking system. The catalyst is cycled between a cracking zone, in which said catalyst is contacted at an elevated temperature with a hydrocarbon feedstock containing the metal contaminant which deposits on the catalyst, and a regeneration zone, in which carbon is oxidized and thereby removed from the catalyst. The metal is included in the group comprising nickel, cobalt and iron. The process comprises contacting the catalyst, prior to the cycling of the catalyst to the cracking zone, with a gas or mixture of gases comprising hydrocarbons which may contain one, two and/or three carbon atoms at passivation conditions, including a temperature of about 1300° F. or above, selected so as to first effect substantially complete reduction of the metal to its metallic state and then deactivation of the metal in its metallic state by carbonization.

Other objectives and embodiments of our invention encompass details about catalyst composition, flow schemes, and passivation reaction conditions, all of which are hereinafter disclosed in the following discussion of each of the facets of our invention.

DESCRIPTION OF THE INVENTION

Catalysts which can be used in the process of this invention include those known to the art as fluidized catalytic cracking catalysts. Specifically, the high activity aluminosilicate or zeolite-containing catalysts can be used and are preferred because of their higher resistance to the deactivating effects of high temperatures, exposure to steam, and exposure to metals contained in the feedstock. The well-known amorphous silica alumina catalysts may also be used. Other examples of catalysts which might be used, with or without zeolite are alumina, magnesia-silica, and titania-silica.

Charge stocks used in the catalytic cracking process are mentioned here because contaminant metals such as nickel, iron, cobalt and vanadium found in the charge stock usually influence the regeneration operation, catalyst selectivity, catalyst activity and the fresh catalyst makeup rate required to maintain a constant activity. Metals contained in the feed are deposited on the catalyst and not only change its selectivity in the direction of less gasoline and more coke and light gas in a given reactor system but tend to deactivate the catalyst. The beneficial effects of this invention occur most particularly for charge stocks having a total nickel, cobalt, iron, and vanadium concentration of at least one part per million by weight of charge stock. This invention is particularly useful, therefore, for FCC units processing heavy or residual charge stocks, i.e. those boiling above 900° F., which frequently have a high metals content.

In a typical FCC process flow, finely divided regenerated catalyst leaves the regeneration zone at a certain temperature and contacts a feedstock in a lower portion of a reactor riser zone. While the resulting mixture, which has a temperature of from about 400° F. to about 1300° F., passes up through the riser, conversion of the feed to lighter products occurs and coke is deposited on the catalyst. The effluent from the riser is discharged into a disengaging space where additional conversion can take place. The hydrocarbon vapors, containing entrained catalyst, are then passed through one or more cyclone separation means to separate any spent catalyst from the hydrocarbon vapor stream. The separated hydrocarbon vapor stream is passed into a fractionation zone known in the art as the main column wherein the hydrocarbon effluent is separated into such typical fractions as light gases and gasoline, light cycle oil, heavy cycle oil and slurry oil. Various fractions from the main column can be recycled along with the feedstock to the reactor riser. Typically, fractions such as light gases and gasoline are further separated and processed in a gas concentration process located downstream of the main column. Some of the fractions from the main column, as well as those recovered from the gas concentrations process may be recovered as final product streams. The separated spent catalyst passes into the lower portion of the disengaging space and eventually leaves that zone passing through stripping means in which a stripping gas, usually steam, contacts the spent catalyst purging adsorbed and interstitial hydrocarbons from the catalyst. The spent catalyst containing coke leaves the stripping zone and passes into a regeneration zone, where, in the presence of fresh regeneration gas and at a temperature of from about 1150° F. to about 1400° F., combustion of coke produces regenerated catalyst and flue gas containing carbon monoxide, carbon dioxide, water, nitrogen and perhaps a small quantity of oxygen. Usually, the fresh regeneration gas is air, but it could be air enriched or deficient in oxygen. Flue gas is separated from entrained regenerated catalyst by cyclone separation means located within the regeneration zone and separated flue gas is passed from the regeneration zone, typically, to a carbon monoxide boiler where the chemical heat of carbon monoxide is recovered by combustion as a fuel for the production of steam, or, if carbon monoxide combustion in the regeneration zone is complete, which is the preferred mode of operation, the flue gas passes directly to sensible heat recovery means and from there to a refinery stack. Regenerated catalyst which was separated from the flue gas is returned to the lower portion of the regeneration zone which typically is maintained at a higher catalyst density. A stream of regenerated catalyst leaves the regeneration zone, and, as previously mentioned, contacts the feedstock in a reaction zone.

One of the major obstacles in the processing of FCC feedstocks, such as residual stocks, which are contaminated with the aforementioned undesirable metal contaminants, is the harmful influence of even minute amounts of these metals. These metals, and in particular nickel, will contribute an undesirable activity to the catalyst on which they deposit which is responsible for the production of additional hydrogen and coke on the catalyst. The presence of large quantities of these metals may also block access to cracking sites and lower the activity of the catalyst.

While it would be ideal to remove these contaminants, such procedures are usually quite elaborate and expensive. A simpler approach is to neutralize or passify the metals present on the catalyst. Such a procedure does not necessarily restore the full clean catalyst activity (since metals may still block a percentage of the catalytic sites), but is quite helpful in lowering hydrogen gas production which can overload gas compressors and in reducing coke on the catalyst resulting from active metal influences.

We have previously found that contacting the fluid cracking catalyst with a light hydrocarbon gas comprising molecules of three carbon atoms or less or a mixture of such gases will effect a substantial lessening in the formation of hydrogen and coke in the catalytic reactor with the aforementioned charge stock. Hydrogen may also be present in the gas. We found it essential that the reaction conditions be selected to first achieve the complete reduction of the contaminating metals to the free metallic state which causes activation of these metals, i.e. places the metals in a state which tends to promote undesirable coke-making reactions. Thus, this complete reduction would seem to be contrary to the purpose of the invention and to deliberately achieve what the aforementioned U.S. Pat. No. 2,575,258 seeks to avoid (neither aforementioned U.S. Pat. No. 2,425,482 nor 4,176,083 make any mention of contaminating metals nor, of course, their degree of reduction). However, we have discovered that the catalyst, by virtue of such complete reduction, acquires a condition for selective carbonization. It is apparent that the contaminating free metal active sites that cause the formation of hydrogen and coke react with the hydrocarbon gas and are thereby carbonized, i.e. are coated with a layer of carbon which insulates these active sites from subsequent contact with the charge stock. It is also apparent, however, that the hydrocarbon gas of three carbon atoms or less in contradistinction to heavier hydrocarbon gas, is inert to the acid sites of the catalyst which catalyze the desirable cracking reactions of the heavy hydrocarbons comprising the feedstock to the FCC process. Therefore, the light hydrocarbon gas will selectively carbonize and deactivate the metal contaminant sites during the contact with the metal contaminated FCC catalyst, while the desirable acid sites of the catalyst are unaffected. We previously considered the preferred passivation reaction conditions to comprise a temperature of from about 900° F. to about 1400° F. and a pressure of from about atmospheric to about 50 psig, and carefully selected so as to go beyond the process of U.S. Pat. No. 2,575,258 and achieve complete reduction of the contaminating metals prior to carbonization, but not carbonization of the desirable acid sites of the catalyst. The skilled operator of the FCC unit would be able to make this selection based on his knowledge of the level of metals contamination in the feedstock, the composition of the light hydrocarbon gas being used for passivation and his observation of the effect of the passivation conditions on the product distribution from the unit. We have recently found, however, that a passivation reaction temperature of about 1300° F. or above is particularly advantageous from the standpoint of the degree of passivation achieved. The upper limit of the temperature would be the maximum temperature to which the catalyst in question could be exposed without being degraded or destroyed.

It is, of course, recognized that propane and lighter hydrocarbon gas is usually formed in the FCC reactors and the catalyst is thereby contacted with such gas. The contaminating metals, therefore, may be passivated by the light gas in the course of the FCC cracking reactions. Passivation in that manner, however, does not occur until well after the contaminating metals have been in contact with the heavy hydrocarbons and have had ample opportunity to catalyze the undesirable coke- and hydrogen-producing reactions.

In contradistinction, our invention effects passivation of the contaminating metals with a light hydrocarbon gas prior to contact of the catalyst with the more valuable heavy hydrocarbons. It is preferred that the passivation be applied in a passivation zone comprising an appropriately designed vessel in the dip leg line between the regenerator vessel and the reactor riser. The separate passivation zone also enables maximization of passivation by permitting the use of a temperature of about 1300° F. or above, the normal temperature in the reactor riser being about 1000° F. or less.

The following non-limiting examples are illustrative of FCC operations in accordance with the process of our invention as compared to an exact same process except for the temperature of the passivation zone being less than the 1300° F. required by our invention. Both examples present data obtained from operation of an FCC pilot plant loaded with 4 grams of a conventional equilibrium catalyst impregnated with 5000 ppm nickel with an aqueous solution of nickel nitrate to simulate typical metal contamination and to simulate the extent of metals contamination due to a feedstock containing at least 1 ppm (wt.) of such metals. The feedstock used was vacuum gas oil having the following specifications:

API @ 60° F. = 31.80
Specific Gravity @ 60° F. = 0.8665
Sulfur wt.% = 0.26
Carbon wt.% = 84.71
IBP (°F) = 358.0
FBP (°F) = 885.0
Wt.% over @ 450° F. = 4.8

The reaction zone conditions used for both examples were a feedstock charge rate of 1.28 grams per second, an inlet temperature of 900° F., a weight hourly space velocity of 15.4 and a catalyst to oil ratio of 3.12:1.00.

EXAMPLE I

This example presents data from two test runs illustrating an FCC process using the 5000 ppm nickel impregnated catalyst passivated with flowing methane at 1100° F. for 5 minutes. The catalyst, prior to treatment in the passivation zone, was air oxidized at 1300° F. for 5 minutes to simulate the condition of the catalyst following regeneration. The following results were obtained:

| TEST RUN | 1 | 2 |
|---|---|---|
| Wt. % carbon (on catalyst before/after test) | 0.18/1.67 | 0.22/1.61 |
| % Conversion of the feed: | | |
| to 450−° F. | 78.5 | 77.2 |
| to $C_5^+$ gasoline | 55.2 | 50.9 |
| Coke | 4.9 | 4.5 |
| $H_2$, SCFB | 245.9 | 305.6 |

EXAMPLE II

This example illustrates the FCC process using the metal contaminated catalyst of Example I and the same process and passivation conditions, except for being passivated in accordance with the process of the present invention, i.e. with flowing methane at 1400° F. The following results were obtained:

| | |
|---|---|
| Wt. % carbon (on catalyst before/after test) | 0.28/1.49 |
| % Conversion of the feed: | |
| to 450−° F. | 80.3 |
| to $C_5^+$ gasoline | 54.4 |
| Coke | 4.0 |
| $H_2$, SCFB | 179.1 |

A comparison of the results of Examples I and II is testimony to the advantageous effect of the present invention. The present invention achieves substantial reduction in the highly undesirable production of hydrogen and coke and carbon on the catalyst without significant change in $C_5^+$ end point gasoline yield. Useful products such as light cycle oil and kerosine (450−° F. fraction) are thus obtained in lieu of the undesirable coke and hydrogen.

We claim as our invention:

1. A process for passivating a metal on fluidized cracking catalyst which has been contaminated with said metal due to the use of said catalyst in a fluidized cracking system, and wherein said catalyst is cycled between a cracking zone, in which said catalyst is contacted at an elevated temperature with a hydrocarbon feedstock containing said metal which deposits on said catalyst, and a regeneration zone, in which carbon is oxidized and thereby removed from said catalyst, said metal being included in the group comprising nickel, vanadium, cobalt or iron, which process comprises contacting said catalyst, prior to the cycling of said catalyst to said cracking zone, with a gas or mixture of gases comprising hydrocarbons selected from the group consisting of hydrocarbons containing one, two and three carbon atoms at passivation reaction conditions, including a temperature of above 1300° F., selected so as to first effect substantially complete reduction of said metal to its metallic state and then deactivation of said metal in its metallic state by carbonization.

2. A process in accordance with claim 1 wherein said catalyst comprises a catalyst included in the group comprising alumina, silica-alumina, magnesia-silica or titania-silica.

3. A process in accordance with claim 1 wherein said catalyst comprises crystalline aluminosilicate.

4. A process in accordance with claim 1 wherein said contacting of said catalyst with said gaseous mixture occurs in a passivation zone comprising a vessel in the dip leg line between the regeneration vessel and the reactor riser.

5. A process in accordance with claim 1 wherein said gas comprises methane.

6. A process in accordance with claim 1 wherein said gas or mixture of gases contains hydrogen.

* * * * *